United States Patent
Hanley et al.

(10) Patent No.: US 10,716,162 B2
(45) Date of Patent: Jul. 14, 2020

(54) RECONSTRUCTING A PERSONAL AREA NETWORK OR SYSTEM AFTER A FAILURE IN THE NETWORK OR SYSTEM

(71) Applicant: Landis+Gyr Innovations, Inc., Alpharetta, GA (US)

(72) Inventors: James Patrick Hanley, Decatur, GA (US); Stephen John Chasko, Marietta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 25 days.

(21) Appl. No.: 16/208,617

(22) Filed: Dec. 4, 2018

(65) Prior Publication Data
US 2020/0178337 A1    Jun. 4, 2020

(51) Int. Cl.
*H04W 76/19* (2018.01)
*H04W 56/00* (2009.01)
(Continued)

(52) U.S. Cl.
CPC ............ *H04W 76/19* (2018.02); *H04W 8/30* (2013.01); *H04W 24/04* (2013.01); *H04W 40/244* (2013.01); *H04W 48/16* (2013.01); *H04W 56/001* (2013.01); *H04W 80/02* (2013.01); *H04W 84/18* (2013.01)

(58) Field of Classification Search
CPC ..................................................... H04W 76/19
See application file for complete search history.

(56) References Cited

U.S. PATENT DOCUMENTS

| 10,419,293 | B1 * | 9/2019 | She ..................... H04L 41/12 |
| 2013/0028295 | A1 * | 1/2013 | Hui ..................... H04B 1/713 |
| | | | 375/135 |
| 2017/0127468 | A1 * | 5/2017 | Saikusa ................ H04W 76/19 |

FOREIGN PATENT DOCUMENTS

EP    3172860    5/2017

OTHER PUBLICATIONS

"IEEE P802.15.10/D01 Draft Recommended Practice for Routing Packets in 802.15.4 Dynamically Changing Wireless Networks", IEEE Draft;D1_P802-15-10_Draft_Recommended_Practice, IEEE-SA, vol. 802.15, Mar. 29, 2015, 106 pages.
(Continued)

*Primary Examiner* — Jason E Mattis
(74) *Attorney, Agent, or Firm* — Kilpatrick Townsend & Stockton LLP (57) ABSTRACT

Systems and methods are disclosed for reconstructing a personal area network ("PAN") after a failure in a system or network. A method can include detecting, by a node, a power failure in a system. The method can further include storing, by the node, data about a parent node in the system at a time of the power failure. The method can further include detecting, by the node, power restoration in the system and entering a restoration state in response to detecting the power restoration. The method can further include transmitting, by the node and to the parent node, an enhanced beacon request via a particular frequency channel associated with the parent node. The method can also include receiving, by the node, an acknowledgement response from the parent node via the frequency channel and receiving, by the node, an enhanced beacon request from the parent node via the frequency channel.

20 Claims, 3 Drawing Sheets

(51) Int. Cl.
*H04W 48/16* (2009.01)
*H04W 24/04* (2009.01)
*H04W 8/30* (2009.01)
*H04W 40/24* (2009.01)
*H04W 80/02* (2009.01)
*H04W 84/18* (2009.01)

(56) References Cited

OTHER PUBLICATIONS

International Patent Application No. PCT/US2019/064118, International Search Report and Written Opinion, dated Feb. 21, 2020, 12 pages.

\* cited by examiner

RECONSTRUCTING A PERSONAL AREA NETWORK OR SYSTEM AFTER A FAILURE IN THE NETWORK OR SYSTEM

TECHNICAL FIELD

This disclosure relates generally to networking and more particularly relates to reconstructing a personal area network ("PAN") or system after a failure the network or system.

BACKGROUND

Resource providers (e.g., utility companies, home automation providers, industrial automation providers, scientific and environmental application providers, or other resource providers) may use various systems in which various devices communicate on a network. For example, in some networks, such as a personal area network ("PAN") or a wireless mesh network defined by the Institute of Electrical and Electronics Engineers ("IEEE") 802.15.4 family of standards, channel hopping can be used such that nodes in the network can communicate data over a designated channel that changes on a scheduled interval. Some such networks can provide a communications network for the resource providers and the resource providers may use the network to communicate between devices (e.g., endpoints, nodes, electric meters, routers, etc.) that can be used to monitor or manage consumption of resources (e.g., electricity, heat, water, as well as other types of resources). For instance, a child node can communicate data about a monitored resource to a parent node or a headend system (e.g., via the parent node) that can collect or store the data.

In some instances, a power outage or other network failure can terminate a connection or communication path between a child node and a parent node and some existing systems and method may cause the child node to remove information indicating the connection or communication path in response to the power outage or network failure. In some such examples, upon power restoration, existing systems and methods may require the child node and the parent node to attempt to form a new network to reconnect with each other. However, such existing systems and processes may be time consuming or computationally expensive and inefficient.

Thus, existing systems and methods for constructing a network (e.g., a PAN) after power restoration in a system present disadvantages such as, but not limited to, those discussed above and may be unable to efficiently construct or reconstruct a network for communication between child and parent nodes upon power restoration. For these and other reasons, improved techniques for reconstructing a PAN after a failure in a system or network are therefore desirable.

SUMMARY

Covered aspects of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim Various examples of the present disclosure provide systems and methods for reconstructing a personal area network ("PAN") or system after a failure in the network or system.

In one example, a method for reconstructing a personal area network ("PAN") after a failure in the PAN includes detecting, by a node, a power failure in in the node. The method also includes storing, by the node, data about a parent node in the system at a time of the power failure. The method further includes detecting, by the node, power restoration in the node and entering into a restoration state in response to detecting the power restoration. The method also includes transmitting, by the node and in response to entering into the restoration state, an enhanced beacon request via a frequency channel associated with the parent node. The method further includes receiving, by the node, an acknowledgement response from the parent node via the frequency channel associated with the parent node. The node is configurable for listening for communication from the parent node via the frequency channel in response to receiving the acknowledgment response. The method also includes receiving, by the node, an enhanced beacon request response from the parent node via the frequency channel associated with the parent node to synchronize communication between the node and the system.

In another example, a system for reconstructing a personal area network ("PAN") after a failure in the PAN includes a child node and a parent node. The child includes a processor and a non-transitory computer-readable medium communicatively coupled to the processor. The processor is configured to detect a power failure in the child node. The processor is further configured to store data about the parent node at a time of the power failure. The processor is further configured to detect power restoration in the child node and entering into a restoration state in response to detecting the power restoration. The processor is further configured to transmit, in response to entering into the restoration state, an enhanced beacon request via a frequency channel associated with the parent node. The processor is further configured to receive an acknowledgement response from the parent node via the frequency channel associated with the parent node, wherein the child node is configurable for listening for communication from the parent node via the frequency channel in response to receiving the acknowledgment response. The processor is also configured to receive an enhanced beacon request response from the parent node via the frequency channel associated with the parent node to synchronize communication between the child node and the system.

In another example, a method for reconstructing a personal area network ("PAN") after a failure in the PAN includes detecting, by a parent node, a power failure in the parent node. The method also includes detecting, by the parent node, power restoration in the parent node and entering into a restoration state in response to detecting the power restoration. The method also includes receiving, by the parent node and in response to entering into the restoration state, an enhanced beacon request from a child node via a frequency channel associated with the parent node. The method also includes transmitting, by the parent node, an acknowledgement response to the child node via the frequency channel associated with the parent node, wherein the child node is configurable for listening for communication from the parent node via the frequency channel in response to receiving the acknowledgment response. The method also includes transmitting, by the parent node, an enhanced beacon request response to the child node via the frequency channel associated with the parent node to synchronize communication between the child node and the system.

The details of one or more aspects and examples are set forth in the accompanying drawings and the description below. Other features and aspects will become apparent from the description, the drawings, and the claims.

DETAILED DESCRIPTION

Certain aspects and features of the present disclosure relate to reconstructing a personal area network ("PAN") or system after a failure in the network or system (e.g., upon power restoration after a power outage in the system or network). For instance, a network can include a node that is a device for monitoring, managing, and/or collecting data about the consumption of a resource (e.g., electricity, heat, water, gas, etc.). The node can be a child node that is connected to a parent node to communicate data about a monitored resource to the parent node or to a headend system (e.g., via the parent node). In some instances, the child node can store information about the network, such as, data indicating a connection or communication path between the child node and the parent node. In some examples, a power outage or other network failure can terminate the connection or communication path between the child node and the parent node and some existing systems and method may not maintain routing information in an internal memory of the child node in response to the power outage or network failure. In some such examples, upon power restoration, existing systems or methods may require the child node to perform another network joining process to connect with the parent node (e.g., by attempting to rediscover the parent node). However, such existing systems and methods may be time consuming or computationally expensive and inefficient. Certain examples described herein address these issues by allowing a child node to retain information about the connection or communication path between the child node and a parent node during a power or network failure and use the retained information to reconstruct the network or reconnect to the network upon power restoration or restoration of the network, which can provide the ability to reconstruct the network in a manner that is computationally inexpensive and time efficient.

In one example, a system can include various nodes for monitoring, managing, and/or collecting data about the consumption of a resource, various parent nodes (e.g., a router, server, or other node or device), and a PAN coordinator device (e.g., a parent node, server, or other device). A child node can be communicatively coupled to a parent node via a network (e.g., a PAN network). The child node can also be communicatively coupled to the PAN coordinator via its parent node and possibly other intervening nodes to communicate data about a monitored resource to the PAN coordinator (e.g., via the parent node), which can collect, store, or forward the data. In some examples, the various nodes can be connected to the PAN coordinator in layers. For instance, a first layer can include parent nodes communicatively coupled to the PAN coordinator without any intervening nodes. The parent nodes in the first layer can be communicatively coupled to various child nodes in a second layer. The child nodes in the second layer can be communicatively coupled to other child nodes in a third layer, thus child nodes in the second layer can be parent nodes with respect to the child nodes in the third layer.

In this example, a power outage or other failure in the system can terminate a connection between the one or more nodes or between the one or more nodes and the PAN coordinator. The various nodes can detect the power outage (e.g., by detecting that it has lost power) and, in response to detecting the power outage, store data about their parent node and any child nodes prior to shutting down due to the power outage. For instance, a time child node (e.g., a child node at the time of the power outage or failure) can store data indicating a MAC address of its time parent node (e.g., the parent node that is communicatively coupled to the child node at the time of the power outage) in an internal memory. The child node can also store layer information associated with the child node, which can include data indicating a number of nodes between the child node and the PAN coordinator (e.g., a number of the parent nodes used to route data from the child node to the PAN coordinator) or other information indicating the layer of the child node in the network. In some instances, the child node may also store data indicating one or more other time child nodes communicatively coupled to the same parent nodes (e.g., a neighbor node or "sibling" node to the child node that is communicatively coupled to the same parent node as the child node) or a MAC address of one of the other child nodes in the internal memory.

Continuing with this example, one or more of the nodes can subsequently detect power restoration (e.g., detect that power supply is restored to the node, system, or network) and the node can enter into a restoration state or "PAN Restoration State." Once in the restoration state, a leaf node, such as a child node of the system that was not communicatively coupled to another child node at the time of the power outage, can attempt to synchronize communication with the network (e.g., reconstruct the network) by transmitting, on a randomized basis, an enhanced beacon request. In this example, the child node transmits the enhanced beacon request on a particular frequency channel associated with a MAC address of its parent node communicatively coupled to the child node at the time of the power outage (e.g., using the data stored in the internal memory of the child node at the time of the power outage). In some examples, the child node transmits the enhanced beacon request on a predetermined channel associated with the MAC address of its parent node. In some examples, the child node transmits the enhanced beacon request to its parent node by communicating on a particular period of a time-slotted channel hopping (TSCH) timeslot. As another example, the child node transmits the enhanced beacon request to its parent node during a primary portion of a primary TSCH timeslot on a frequency channel according to a channel hopping pattern utilized by the parent device. In some examples, the child node transmits the enhanced beacon request on a particular frequency channel associated with a MAC address of its parent node by utilizing one or more bits (e.g., one or more lower bits) of the MAC address of the parent node to identify the particular frequency channel. In one example, a hashing function (e.g., SHA-256) or any suitable randomization method or technique can be applied to the MAC address of the parent node and the child node can utilize the lower bits of the output of the hashing function or randomization process to identify a particular frequency channel via which the child node can communicate the enhanced beacon request to its parent node. In some examples, the MAC address of the parent node can be uniquely randomized or hashed and the child node can receive or obtain a pre-determined, randomized key. In this example, the child node uses the randomized or hashed MAC address of the parent node concatenated with the key to determine a particular frequency channel (e.g., the lower bits of the randomized MAC address concatenated with the randomized key) via which the child node can communicate the enhanced beacon request to its parent node. In some instances, a mechanism for selecting, by the child node, the frequency channel, may overload an existing mechanism that details channel selection for primary network hopping or, in the case of the Secondary Network, a child node or Low-Energy-End-Point node hopping profile where the channel destination is determined by combination of a current ASN number and a target MAC address. In some instances, a mechanism for selecting, by the child node, the frequency channel, may overload an existing mechanism that details channel selection for primary network hopping or, in the case of the Secondary Network, a child node or Low-Energy-End-Point node hopping profile where the channel destination is determined by combination of a current ASN number and a target MAC address. In still another embodiment, the parent node may store data to track which child devices are using it as a parent node and the parent node can wait to receive an enhanced beacon request from the child node to synchronize with the child node. The enhanced beacon request can include information for synchronizing communications between the child node and the PAN network, such as, an information element that can indicate that the child node is restored from the power outage or failure.

The parent node of the child node that transmits the enhanced beacon request can also be in a restoration state (e.g., due to the power outage). The parent node may be disconnected from the network and can listen for communications from the child node on the particular frequency channel that is associated with its MAC address. In some instances, the parent node can listen for the communication from the child node for a particular period of time. The parent node can listen for communications from the child node for a period of time (e.g., a period of time based on a layer position of the parent node). As an example, the period of time can be based on whether the parent node is in the first, second, or third layer of the system. For instance, if the parent node is in the third layer, the parent node may listen for communication from its child node for a longer period of time as compared to a parent node that is in the second layer. As another example, the period of time can be based on a number of other parent nodes between the parent node and the PAN coordinator at the time of the power outage.

Continuing with this example, the parent node can receive an enhanced beacon request from the child node, and transmit an acknowledgment response (e.g., a MAC layer acknowledgement) to the child node on the frequency channel associated with the MAC address of the parent node in response to receiving the enhanced beacon request. In some examples, once the child node receives the acknowledgment response from the parent node, the child node can continue to listen for communications (e.g., listen for an enhanced beacon request response) from the parent node on the frequency channel. In this example, the parent node can transmit an enhanced beacon request response to the child node on the frequency channel associated with the MAC address of the parent node and the enhanced beacon request response can include information that can be used by the child node to synchronize communications with the PAN network. As an example, once the child node receives an enhanced beacon request response from a parent node, the child node can synchronize communication with the system based on receiving the enhanced beacon request response (e.g., communicate with the PAN coordinator via one or more parent nodes to send information, such as measurements of the consumption of a resource). As another example, an internal clock of the child node may have switched to an OFF state during the power outage and the child node may realign or synchronize the clock based on the information included in the enhanced beacon request response. In some instances, if the parent node is also in a restoration state, the information in the enhanced beacon request response may include instructions indicating one or more operations (e.g., MAC layer operations) that can be performed by the child node. As an example, the information can include instructions that: indicate that the child node should continue to communicate with the parent node via the frequency channel associated with the parent node; specify or assign an Absolute Slot Number ("ASN") used by the parent node via which the child node can communicate with the parent node; use a hopping sequence and slot assignment to communicate with the parent node (e.g., by transitioning or "hopping" from one channel to another on a time interval such as, 28 ms); or any other instruction.

As explained above, in this example, the parent node can also be in a restoration state. In this example, once the parent node is connected to, or synchronized with, its child node, the parent node can act as a child node and transmit an enhanced beacon request to its parent node in substantially the same manner as described above to synchronize communication with its parent node. In this example, the parent node in the system can iterate one or more processes described above to synchronize communication between the parent node and its parent node until each node is communicatively coupled to the PAN coordinator device via its parent node. For instance, once a child node in the third layer is synchronized with its parent node in the second layer, the parent node in the second layer can synchronize communications with its parent node in the first layer and the parent node in the first layer can synchronize communications with the PAN coordinator. In this example, each parent node that synchronizes with a child node can be referred to as a routing parent (e.g., a parent node for routing data from the child node to the PAN coordinator). In some instances, synchronizing communication (e.g., transmission and receipt of communications) between child nodes and parent nodes after a power outage or failure as described above can indicate to the nodes that a communication path or route between the nodes is still valid, which can cause the nodes to retain data about the network (e.g., data about a frequency channel via which to communicates stored at the time of the power outage) and use the retained information to reconstruct the network or reconnect to the network upon power restoration or restoration of the network in a manner that is computationally inexpensive and time efficient.

As used herein, the term "child node" is used to refer to any node that is communicatively coupled to at least one parent node. As an example, a child node is a node that is communicatively coupled to a parent node, where the child node is logically farther away from a PAN coordinator as compared to the parent node.

As used herein, the term "parent node" is used to refer to any node that is communicatively coupled to at least one child node. As an example, a parent node is a node that is logically closer to a PAN coordinator as compared to its child node.

As used herein, the term "leaf node" is used to refer to a child node that is not a parent node.

As used herein, the term "time parent node" is used to refer to a parent node that is communicatively coupled to a child node at a time of a failure in the system or network.

As used herein, the term "routing parent node" is used to refer to any parent node that is communicatively coupled to a child node for routing data from the child node to a PAN coordinator.

As used herein, the term "time child node" is used to refer to a child node that is communicatively coupled to a time parent node at a time of a failure in the system or network.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
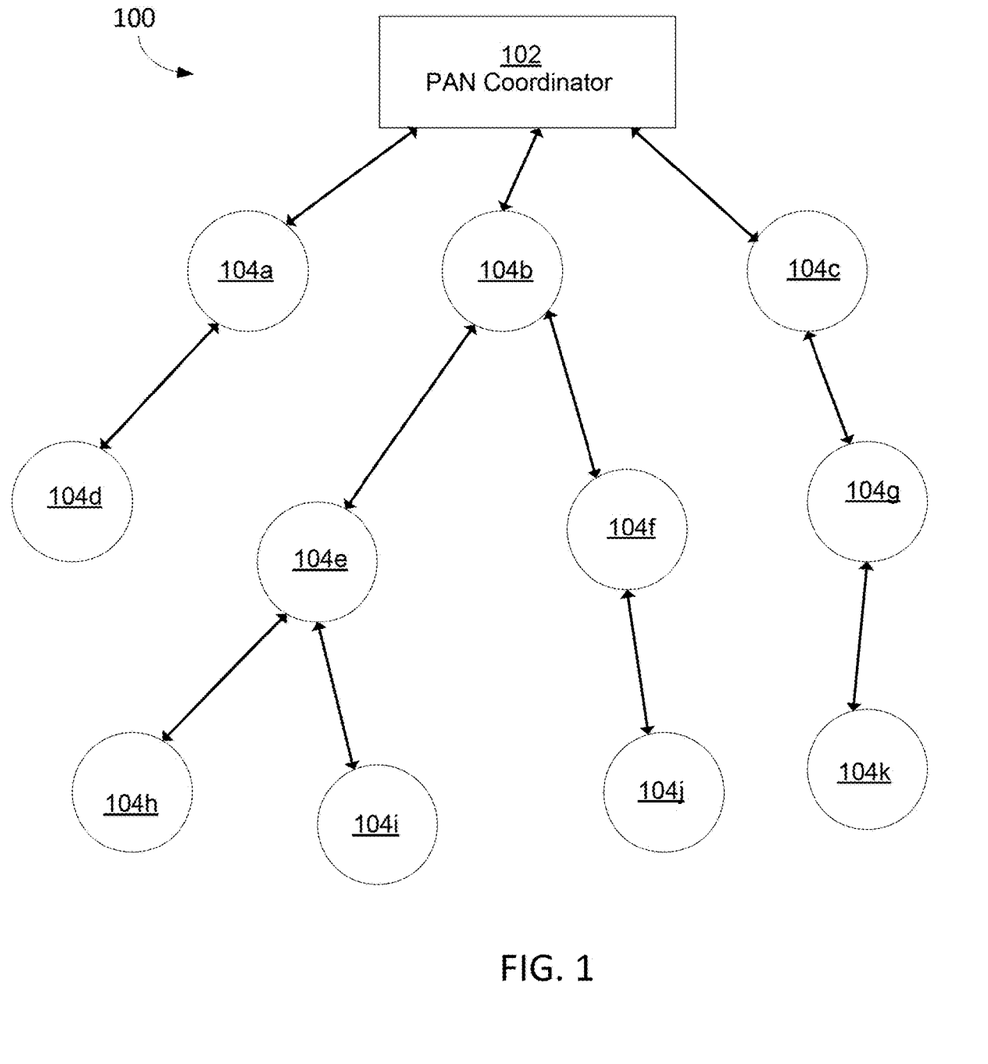
FIG. 1 is an example of a system for reconstructing a personal area network ("PAN") or system after a failure in the network or system according to one example of the present disclosure.

Referring now to the drawings, FIG. 1 is an example of a system 100 (e.g., a network) for reconstructing a personal area network ("PAN") or system after a failure in the network or system according to one example of the present disclosure.

In the example depicted in FIG. 1, the system 100 can be a PAN and can include a PAN can include a PAN coordinator device 102 (e.g., a parent node, server, computing device, network device, storage device, or other device). The system 100 can also include one or more nodes 104a-k, which can each be a device (e.g., an endpoint, data source, module, etc.) for monitoring, managing, and/or collecting data about the consumption of a resource, such as electricity, heat, water, gas, etc. In some examples, the PAN coordinator device 102 or each node 104a-k can include various components for monitoring, managing, and/or collecting data about a resource, storing the data, and communicating the data to one or more other devices. In some instances, the PAN coordinator device 102 can serve as a collection point to which the nodes 104a-k can send information, such as measurements of the consumption of the resource. In some examples, each of the nodes 104a-k can be any type of device or node.

In some example the PAN coordinator device 102 or each node 104a-k can include one or more components, such as a processor, a bus, a database, a memory, input/output interface components, a display device, communication device, etc. for processing, storing, or communicating data. In some instances, the PAN coordinator device 102 or each node 104a-k can communicate within a network, such as a PAN network, using various communication technologies such as radio frequency ("RF").

In this example, some of the nodes 104a-k are child devices (e.g., child nodes) or parent devices and the various nodes 104a-k can be communicatively coupled. For example, each node 104h and 104i can be a child node of a parent node 104e and communicatively coupled to the parent node 104e. Node 104j can be a child node of a parent node 104f and communicatively coupled to the parent node 104f and node 104k can be a child node of a parent node 104g and communicatively coupled to the parent node 104g. Node 104d can be a child node of a parent node 104a and communicatively coupled to the parent node 104a. Nodes 104e-f can each be a child node of a parent node 104b and communicatively coupled to the parent node 104b and node 104g can be a child node of a parent node 104c and communicatively coupled to the parent node 104c. Node 104d can be a child node of a parent node 104a and communicatively coupled to the parent node 104a. In the example depicted in FIG. 1, nodes 104a-c can each be communicatively coupled to the PAN coordinator device 102. In this manner, each of the nodes 104a-k can be communicatively coupled to the PAN coordinator device 102 (e.g., via one or more parent nodes).

In some examples, the system 100 can include one or more layers of nodes 104a-k. For instance, the system 100 can include a first layer that includes various nodes 104a-c communicatively coupled directly to PAN coordinator 102. Child nodes 104d-g are communicatively coupled to nodes in the first layer and are in a second layer. Nodes 104e-g can be parent nodes that are communicatively coupled to child nodes 104h-k in a third layer, thus the child nodes 104e-g in the second layer can be parent nodes with respect to child nodes 104h-k in the third layer.

In some examples, the system 100 can be powered by a power supply (not shown). The power supply can include any device or system for providing power for operating one or more of the various nodes 104a-k or the PAN coordinator 102. In some instances, a power failure (e.g., power outage) can occur in the system 100 (e.g., a failure or outage of the power supply for the system 100). In this example, the power failure can terminate (e.g., cut off) a connection between the one or more nodes 104a-k or between the nodes 104a-k and the PAN 102. As an example, the power failure can terminate the connection between child node 104h and the parent node 104e.

In some examples, one or more of the nodes 104a-k can detect the power failure in the system 100. For example, the node 104h can detect that it has lost power by detecting that a main power supply is no longer providing power to the child node 104h (e.g., the node 104h detects that it is no longer being powered by a main power supply and is now being powered by a backup power source, such as an internal battery). In some instances, the one or more nodes 104-k can detect the power failure by detecting that a main power supply is not providing power to the node 104a-k for a period of time. As an example, the node 104h can detect that the main power supply is not providing power to the node 104h and the node 104h can continue to detect the loss of power for a period of time (e.g., thirty seconds or any suitable time period) and, in response to detecting the loss of power for the period of time, the node 104h can detect or determine the power failure in the system 100. In still another example, the nodes 104a-k can detect or determine the power failure in the system 100 upon power restoration (e.g., when the power supply begins to provide power to the system 100 after a power failure). For instance, the main power supply can stop providing power to the system 100 due to a power failure. Subsequently, the main power supply can be restored and begin providing power to the system 100. Upon restoration, the node 104h can determine that there was a previous power failure in the system.

In some examples, in response to detecting a power failure in the system 100, the one or more nodes 104a-k can store data about the system 100 at the time of the power failure. For example, the nodes 104a-k can store, in an internal memory device, data indicating a MAC address of one or more parent nodes communicatively coupled to the node 104a-k at the time of the power failure. As an example, the node 104h can detect a power failure and, in response to detecting the power failure, the node 104h can store data indicating the MAC address of one or more parent nodes 104e and 104b communicatively coupled to the node 104h for routing data from the node 104h to the PAN coordinator 102. As another example, the node 104a-k can store layer information associated with the node 104, which can include data indicating a number of parent nodes between the node 104a-k and the PAN coordinator 102 at the time of the power failure (e.g., a number of parent nodes communicatively coupled to the node 104a-k to route data from the node 104a-k to the PAN coordinator 102). As an example, the node 104h can detect a power failure and, in response to detecting the power failure, the node 104h can store data indicating that there are two parent nodes (e.g., node 104e and 104b) between the node 104h and the PAN coordinator 102 at the time of the power failure. As still another example, the node 104a-k can store data indicating one or more neighbor or "sibling" nodes communicatively coupled to the same parent node or a MAC address of each of the other nodes communicatively coupled to the same parent node at the time of the power failure. As an example, the node 104h can store data indicating that the node 104i is communicatively coupled to the same parent node (e.g., parent node 104e), data indicating that only one other node is communicatively coupled to the same parent node, and/or a MAC address of the node 104i at the time of the power failure. In some examples, the node 104a-k can store data indicating one or more neighbor or "sibling" nodes to synchronize communication with the system 100. For instance, the node 104h can store data indicating that the node 104i is communicatively coupled to the same parent node 104e and transmit one or more signals to the node 104i to synchronize with the parent node 104e via the node 104i.

In still another example, the node 104a-k can store data indicating one or more potential parent nodes or data indicating a scoring algorithm for determining a parent node or potential parent nodes. In some instances, the scoring algorithm can cause the node 104a-k to use historical data such as, but not limited to, a strength of a signal between the node 104a-k and one or more potential parent nodes, a signal success rate between the node 104a-k and one or more potential parent nodes, a rate of data communication between the node 104a-k and one or more potential parent nodes, a number of layers between the node 104a-k and the PAN coordinator 102, etc. to determine a current or potential parent node. As an example, the node 104h can store data indicating that nodes 104e and 104b are potential parent nodes. In this example, the node 104h can use the scoring algorithm to determine that the node 104e is the parent node of the node 104h in response to determining that the strength of the signal between the node 104h and the node 104e is higher than the strength of the signal between the node 104h and the node 104b. In some examples, the node 104a-k can store data indicating one or more nodes that are not potential parent nodes.

In some embodiments, the nodes 104a-k can store, in an internal memory device, data indicating a full routing path for routing data from the node 104a-k to the PAN coordinator 102. In this example, the nodes 104a-k can store data indicating each node 104a-k between the node 104a-k and the PAN coordinator 102. As an example, the node 104i can store data indicating that the nodes 104e and 104b are between the node 104i and the PAN coordinator 102 for routing information from the node 104i to the PAN coordinator 102.

In some embodiments, a parent node may store data to track which child devices are using it as a parent node and the parent node can wait to receive a signal from the child node to synchronize with the child node. As an example, the parent node 104e can store data indicating that the child nodes 104h and 104i are using it as a parent node and the parent node 104e can wait to receive signal from the child nodes 104h and 104i to synchronize with the child nodes 104h and 104i. In some example, one or more parent nodes in the system 100 can store data indicating one or more child nodes communicatively coupled to the parent node. In this example, the parent node can use the data to synchronize communication with the child node upon the child node entering into a restoration state, as described in further detail below. For instance, upon a child node entering into a restoration state, the parent node can wait to receive a signal from the child node or transmit an acknowledgement response (e.g., a MAC layer acknowledgement) to each child node communicatively coupled to the parent node during separate timeslots or broadcast the acknowledgement responses to the various child nodes simultaneously.

Upon power restoration to the system 100, one or more nodes 104a-k can detect the power restoration and enter into a restoration state (e.g., "PAN Restoration State.") In some instances, once in a restoration state, each node 104a-k in the system 100 that was communicatively coupled to at least one child node 104a-k at the time of the power failure (e.g., each parent node 104a-c, 104e-g) can listen for communications from a child node on a particular frequency channel that is associated with the MAC address of the parent node 104a-c, 104e-g. As an example, once the parent node 104e is in a restoration state, the parent node 104e can listen for communications from child nodes 104h and 104i on a frequency channel associated with the MAC address of the parent node 104e. In some examples, the parent node 104a-c, 104e-g can listen for communication from a child node for a particular period of time (e.g., a period of time based on a layer position of the parent node 104a-c, 104e-g). As an example, the period of time can be based on whether the parent node 104a-c, 104e-g is in the first, second, or third layer of the system 100. For instance, the parent nodes 104a-c in the third layer of the system 100 may listen for communication from a child node for a longer period of time as compared to the parent nodes 104e-g that are in the second layer of the system 100. As another example, the period of time can be based on a number of other parent nodes between the parent node 104a-c, 104e-g and the PAN coordinator 102 at the time of the power outage.

In some examples, once in a restoration state, a leaf node (e.g., a child node in the system 100 that was not communicatively coupled to another child node at the time of the power failure such as child nodes 104d, 104h-k) can attempt to synchronize communication with the system 100 (e.g., attempt to reconstruct the system 100) using data stored by the leaf node. In some examples, the child node 104d, 104d, 104h-k can attempt to synchronize with the system 100 by transmitting, on a randomized basis, an enhanced beacon request ("EBR"). As an example, the child node 104h can transmit, on a randomized basis, an EBR (e.g., an 802.15.4 EBR) to the system 100. In some instances, the child node 104d, 104h-k transmits the EBR on a particular frequency channel associated with a MAC address of a parent node 104a-c, 104e-g communicatively coupled to the child node 104d, 104h-k at the time of the power failure (e.g., using data stored in the internal memory of the child node 104d, 104h-k at the time of the power failure). In some examples, the EBR can include information for synchronizing communications between the child node 104d, 104h-k and the system 100, such as an information element that can indicate that the child node 104d, 104h-k is restored from the power failure.

In some examples, the parent node 104e can listen for communications from the child nodes 104h, 104i on a particular frequency channel as described above, receive an EBR from the child node 104h, 104i, and transmit an acknowledgement response (e.g., a MAC layer acknowledgement) to the child node 104h, 104i on the frequency channel. As an example, the child node 104h can transmit an EBR to the parent node 104e on a particular frequency channel associated with a MAC address of the parent node 104e. In this example, the parent node 104e can then transmit an acknowledgement response to the child node 104h on the particular frequency channel. In some instances, if the child node 104h, 104i does not receive an acknowledgement response from the parent node 104e, the child node 104h, 104i may attempt to retransmit the EBR to the parent node 104e. In this example, if the child node 104h, 104i retransmits the EBR and still fails to receive an acknowledgement response, the child node 104h, 104i can transmit a broadcast EBR to any node 104a-k in the system 100 to attempt to synchronize communication with the system 100. In this example, a node 104a-k receiving the broadcast EBR can respond with an EBR response using Clear Channel Assessment ("CCA").

In some examples, once a child node 104d, 104h-k receives an acknowledgement response from a parent node 104a-c, 104e-g, the child node 104d, 104h-k can continue to listen for communications from the parent node 104a-c, 104e-g on the frequency channel. In some examples, the parent node 104a-c, 104e-g can transmit an EBR response to the child node 104d, 104h-k on the frequency channel associated with the parent node 104a-c, 104e-g. As an example, the parent node 104e can transmit an EBR response to the child node 104h on a frequency channel associated with the MAC address of the parent node 104e. In some instances, an EBR response can include information that can be used by the child node 104d, 104h-k to synchronize communications with the system 100. As an example, once the child node 104d, 104h-k receives an EBR response from a parent node 104a-c, 104e-g, the child node 104d, 104h-k can synchronize communication with the system 100 in response to receiving the EBR response (e.g., communicate with the PAN coordinator 102 via one or more parent nodes to send information, such as measurements of the consumption of a resource). As another example, an internal clock of the child node 104h may have switched to an OFF state during the power failure and the child node 104h may realign or synchronize the clock based on information included in the EBR response from the parent node 104e. In some examples, if the child node 104d, 104h-k is in a restoration state and the parent node 104a-c, 104e-g is also in a restoration state, the information included in the EBR response may include instructions indicating one or more operations (e.g., MAC layer operations) that can be performed by the child node 104d, 104h-k. As an example, if the child node 104h and the parent node 104e are both in a restoration state, the parent node 104e can transmit an EBR response that includes instructions indicating that the child node 104h should continue to communicate with the parent node 104e via the frequency channel associated with the MAC address of the parent node 104e, use an Absolute Slot Number ("ASN") to communicate with the parent node 104e, or use a hopping sequence and slot assignment to determine a time slot and frequency for communicating with the parent node 104e.

In some examples, the various child and parent nodes in the system 100 can iterate one or more processes described above to synchronize communication between the various nodes 104a-k until each node 104a-k is communicatively coupled to the PAN coordinator 102 via a parent node after power restoration in the system 100. As an example, once the child node 104h is synchronized with parent node 104e, the node 104e can become a child node with respect to node 104b and synchronize communications with the node 104b in substantially the same manner as described above. In this example, the node 104b can then synchronize communications with the PAN coordinator 102 in substantially the same manner as described above.

In some instances, synchronizing communications between child nodes and parent nodes after a power failure as described above can indicate to the nodes 104a-k that a communication path or route between the nodes 104a-k is still valid, which can cause the nodes 104a-k to retain data about the system 100 (e.g., data about a frequency channel via which to communicate stored at the time of the power failure) and use the retained information to reconstruct the system 100 or reconnect to the system 100 upon power restoration or restoration of the network in a manner that is computationally inexpensive and time efficient.

In another example, once in a restoration state, a parent node in the system 100 that was communicatively coupled to at least one child node at the time of the power failure can communicate with a child node by utilizing one or more communication technologies or protocols. In this example, the parent node can communicate with the PAN coordinator 102 or other nodes communicatively coupled to the PAN coordinator using one communication technology or protocol and can communicate with a child node by utilizing a different communication technology or protocol. As an example, the parent node 104e can listen for communication from the child node 104h on a primary network. In this example, the parent node 104e can also listen for the communication from the child node 104i on a Low Energy End-Point ("LEEP") network. In this example, the LEEP network can be different from the primary network and the parent node 104e can listen for communications from the child node 104h and the child node 104i by alternating between the primary network and the LEEP network. In some examples, the parent node 104e can listen for communication from the child node 104h on a channel that is based on the MAC address of the parent node 104e and can listen for communication from child node 104i on the LEEP network and can listen on the LEEP network for an amount of time corresponding to a number of primary network timeslots (e.g., 1024 timeslots).

Although FIG. 1 illustrates a particular arrangement of the system 100, various additional arrangements are possible. As an example, while FIG. 1 illustrates a certain number of nodes 104a-k and PAN coordinator 102, the present disclosure is not limited to such configurations. Rather, in other examples, the system 100 may include any suitable number or types of nodes 104a-k, PAN coordinator 102, or other devices. As another example, while FIG. 1 illustrates a particular configuration of various connections between the nodes 104a-k and the PAN coordinator 102, the present disclosure is not limited to such a configuration. Rather, in other examples, the nodes 104a-k and the PAN coordinator 102 can be communicatively coupled in any suitable manner.

Figure 2:
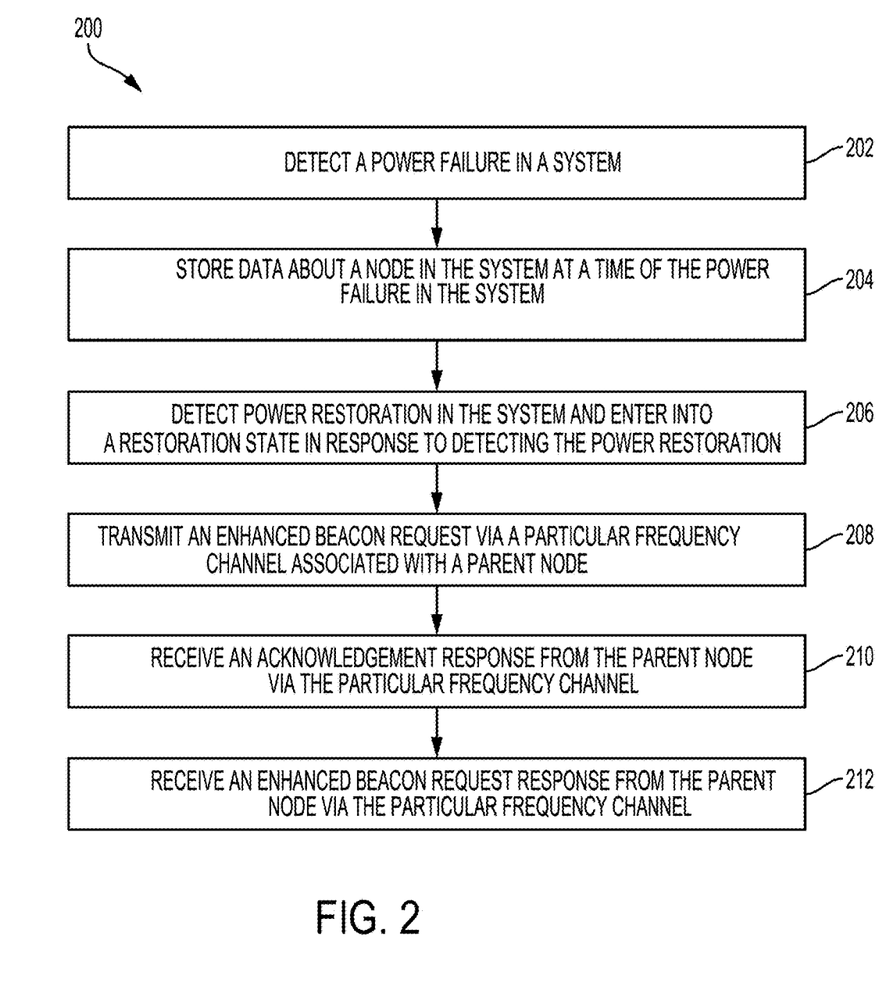
FIG. 2 is a flow chart depicting an example of a process for reconstructing a PAN or system after a failure in the network or system according to one example of the present disclosure.

FIG. 2 is a flow chart depicting an example of a process for 200 reconstructing a PAN after a failure in a system or network according to one example of the present disclosure. In some examples, the steps in FIG. 2 may be implemented in program code that is executable by a processor, for example, the processor in a general-purpose computer or a server. In some examples, one or more steps shown in FIG. 2 may be omitted or performed in a different order. Similarly, in some examples, additional steps not shown in FIG. 2 may also be performed. The method 200 of FIG. 2 is described with reference to FIG. 1, but other implementations are possible.

In block 202, a node 104*a-k* of a system 100 (e.g., a network) detects a power failure in the node 104*a-k*. For example, the system 100 can include a PAN and the system 100 can be powered by a main power supply and one or more of the nodes 104*a-k* can detect (e.g., determine) a power failure in the system 100 by detecting that that the main power supply is no longer providing power to the system 100 or the node 104*a-k*. For example, the node 104*h* can detect the power failure by determining that the node 104*h* is no longer being powered by the main power supply and is now being powered by a limited power source, such as a capacitor. In some examples, the node 104*a-k* can detect the power failure in the system 100 by determining that the main power supply is not providing power to the system 100 or the node 104*a-k* for a period of time (e.g., by determining that the main power supply has not provided power to the system 100 or the node 104*a-k* for period of thirty seconds).

In block 204, the node 104*a-k* stores data about another node 104*a-k* in the system 100 at a time of the power failure in the system 100. For example, the node 104*d*, 104*h-k* can detect a power failure in the system (e.g., in block 202) and, in response to detecting the power failure, the node 104*d*, 104*h-k* can store, in an internal memory device, data indicating a MAC address of one or more parent nodes 104*a*, 104*e-g* communicatively coupled to the node 104*d*, 104*h-k* at the time of the power failure. As an example, the node 104*h* can detect a power failure in the system 100 and, in response to detecting the power failure, the node 104*h* can store data indicating the MAC address of one or more parent nodes 104*e* and 104*b* communicatively coupled to the node 104*h*.

As another example, in block 204, the child node 104*d*, 104*h-k* can store layer information associated with the child node 104*d*, 104*h-k*, which can include data indicating a number of parent nodes 104*a-c*, 104*e-g* between the child node 104*d*, 104*h-k* and the PAN coordinator 102 at the time of the power failure (e.g., a number of parent nodes 104*a-c*, 104*e-g* communicatively coupled to the child node 104*d*, 104*h-k* to route data from the child node 104*d*, 104*h-k* to the PAN coordinator 102). For instance, the node 104*h* can detect a power failure and, in response to detecting the power failure, the node 104*h* can store data indicating that there are two parent nodes (e.g., node 104*e* and 104*b*) between the node 104*h* and the PAN coordinator 102 at the time of the power failure. As still another example, in block 204, the child nodes 104*d*, 104*h-k* can store data indicating one or more nodes communicatively coupled to the same parent node 104*a-c*, 104*e-g* or a MAC address of each of the other nodes communicatively coupled to the same parent node 104*a-c*, 104*e-g*. For instance, the node 104*h* can store data indicating that the node 104*i* is communicatively coupled to the same parent node 104*e*, data indicating that only one other node 104*i* is communicatively coupled to the same parent node 104*e*, and/or a MAC address of the other node 104*i* communicatively coupled to the same parent node 104*e* at the time of the power failure.

In block 206, the node 104*a-k* detects power restoration in the system 100 and, in response to detecting the power restoration, enters into a restoration state. For example, upon power restoration to the system 100, one or more of the nodes 104*a-k* can enter into a restoration state (e.g., "PAN Restoration State.")

In block 208, an enhanced beacon request ("EBR") is transmitted via a particular frequency channel associated with a parent node.

In some examples, once a child node 104*d*, 104*h-k* that is not communicatively coupled to another child node at a time of a power failure in the system 100 is in a restoration state (e.g., in block 206), the child node 104*d*, 104*h-k* can attempt to synchronize communication with the system 100 (e.g., reconstruct the system 100). For example, in response to entering into a restoration state, the child node 104*d*, 104*d*, 104*h-k* can attempt to synchronize with the system 100 by transmitting, on a randomized basis, an EBR. As an example, the child node 104*h* can transmit, on a randomized basis, an EBR (e.g., an 802.15.4 EBR) to the system 100. In some instances, the child node 104*d*, 104*h-k* transmits the EBR on a particular frequency channel associated with a MAC address of a parent node 104*a-c*, 104*e-g* communicatively coupled to the child node 104*d*, 104*h-k* at the time of the power failure (e.g., using data stored in the internal memory of the child node 104*d*, 104*h-k* at the time of the power failure). In some examples, the EBR can include information for synchronizing communications between the child node 104*d*, 104*h-k* and the system 100, such as an information element that can indicate that the child node 104*d*, 104*h-k* is restored from the power failure.

In some instances, once in a restoration state, each node 104*a-k* in the system 100 that was communicatively coupled to at least one child node 104*a-k* at the time of the power failure (e.g., each parent node 104*a-c*, 104*e-g*) can listen for communications from a child node on a particular frequency channel that is associated with the MAC address of the parent node 104*a-c*, 104*e-g*. As an example, once the parent node 104*e* is in a restoration state, the parent node 104*e* can listen for communications from child nodes 104*h* and 104*i* on a frequency channel associated with the MAC address of the parent node 104*e*. In some examples, the parent node 104*a-c*, 104*e-g* can listen for communication from a child node for a particular period of time (e.g., a period of time based on a layer position of the parent node 104*a-c*, 104*e-g*).

In block 210, an acknowledgement response from the parent node is received. For example, the parent node 104*a-c*, 104*e-g* can listen for communications from the child nodes 104*d*, 104*h-k* on a particular frequency channel associated with the parent node 104*a-c*, 104*e-g*, receive an EBR from the child node 104*d*, 104*h-k*, and transmit an acknowledgement response (e.g., a MAC layer acknowledgement) to the child node 104*d*, 104*h-k* on the frequency channel. As an example, the child node 104*h* can transmit an EBR to the parent node 104*e* on a particular frequency channel associated with a MAC address of the parent node 104*e*. In this example, the child node 104*h* can then receive an acknowledgement response from the parent node 104*e* on the frequency channel.

In block 212, an EBR response is received from the parent node 104*a-c*, 104*h-k* via the particular frequency channel. For example, once a child node 104*d*, 104*h-k* receives an acknowledgement response from a parent node 104*a-c*, 104*e-g* (e.g., in block 210) the child node 104*d*, 104*h-k* can continue to listen for communications from the parent node 104a-c, 104e-g on the frequency channel. In some examples, the child node 104d, 104h-k can receive an EBR response from the parent node 104a-c, 104e-g on the frequency channel associated with the parent node 104a-c, 104e-g. As an example, the child node 104h can receive an EBR response from the parent node 104e on a frequency channel associated with the MAC address of the parent node 104e. In some instances, an EBR response can include information that can be used by the child node 104d, 104h-k to synchronize communications with the system 100. As an example, once the child node 104d, 104h-k receives an EBR response from a parent node 104a-c, 104e-g, the child node 104d, 104h-k can synchronize communications with the system 100 in response to receiving the EBR response (e.g., communicate with the PAN coordinator 102 via one or more parent nodes to send information, such as measurements of the consumption of a resource). As another example, an internal clock of the child node 104h may have switched to an OFF state during the power failure and the child node 104h may realign or synchronize the clock based on information included in the EBR response from the parent node 104e. In some examples, if the child node 104d, 104h-k is in a restoration state and the parent node 104a-c, 104e-g is also in a restoration state, the information included in the EBR response may include instructions indicating one or more operations (e.g., MAC layer operations) that can be performed by the child node 104d, 104h-k. As an example, if the child node 104h and the parent node 104e are both in a restoration state, the child node 104h can receive an EBR response from the parent node 104e that includes instructions indicating that the child node 104h should continue to communicate with the parent node 104e via the frequency channel associated with the MAC address of the parent node 104e, synchronize to an Absolute Slot Number ("ASN") used by the parent node 104e to communicate in the system 100 by transitioning or "hopping" from one channel to another on a time interval.

While in some examples described above, a node 104a-k can synchronize communications between the node 104a-k and a parent node after a power failure (e.g., after detecting a power failure in the node 104a-k or system 100), the present disclosure is not limited to such configurations. Rather, in other examples, a node 104a-k of the system 100 may not detect a power failure in the node 104a-k (e.g., in block 202) and the node 104a-k can store data about another node 104a-k in the system 100. In some examples, the node 104a-k may periodically store data about one or more nodes 104a-k or the system 100 regardless of detecting a power failure and the node 104a-k can use the stored data to synchronize communication with the system 100. As an example, a node 104d, 104h-k can periodically or continuously (e.g., over a period of time) store, in an internal memory device, data indicating a MAC address of one or more parent nodes 104a, 104e-g communicatively coupled to the node 104d, 104h-k regardless of the node 104d, 104h-k detecting a power failure. As another example, the child node 104d, 104h-k can store layer information associated with the child node 104d, 104h-k, which can include data indicating a number of parent nodes 104a-c, 104e-g between the child node 104d, 104h-k and the PAN coordinator 102 regardless of the node 104d, 104h-k detecting a power failure. In this example, a child node 104a-k can attempt to synchronize communication with the system 100 or a parent node (e.g., attempt to construct or reconstruct the system 100) using data stored by the child node 104a-k in substantially the same manner as described above.

Figure 3:
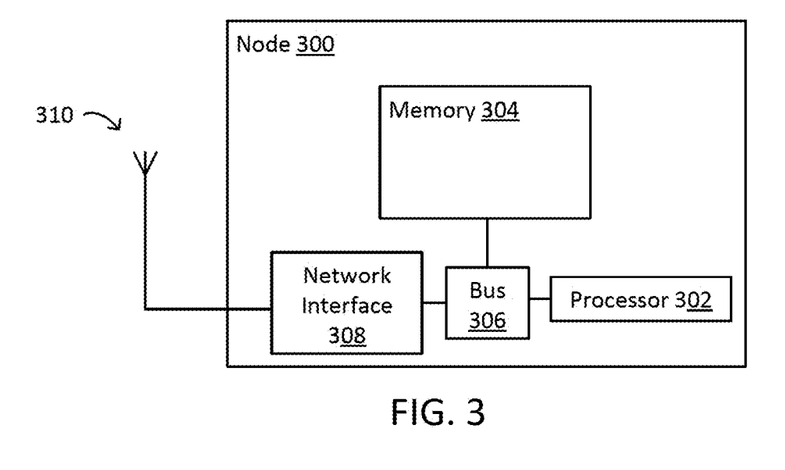
FIG. 3 is a schematic block diagram of an example of a node of the system of FIG. 1 according to one example of the present disclosure.

FIG. 3 is a schematic block diagram of an example of a node 300 of the system of FIG. 1 (e.g., a node 104a-k or a PAN coordinator 102) according to one example of the present disclosure. In some examples, the node 300 can be used to reconstruct a PAN or system after a failure in the network or system.

The node 300 can include a processing device 302. Non-limiting examples of the processing device 302 can include a microprocessor, an application-specific integrated circuit ("ASIC"), a state machine, or other suitable processing device. The processing device 302 can include any number of processing devices, including one. The processing device 302 can be communicatively coupled to computer-readable media, such as a memory device 304. The processing device 302 can execute computer-executable program instructions and/or access information respectively stored in the memory device 304.

The memory device 304 can store instructions that, when executed by the processing device 302, cause the processing device 302 to perform operations described herein. The memory device 304 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The node 300 can include a bus 306 that can communicatively couple one or more components of the node 300. Although the processor 302, the memory 304, and the bus 306 are depicted in FIG. 3 as separate components in communication with one another, other implementations are possible. For example, the processor 302, the memory 304, and the bus 306 can be components of printed circuit boards or other suitable devices that can be disposed in a node 300 to store and execute programming code.

The node 300 can also include network interface device 308. The network interface device 308 can be a transceiving device configured to establish a one or more of the wireless communication links via an antenna 310. A non-limiting example of the network interface device 308 is an RF transceiver, a power line communication device, a cellular device, etc. and can include one or more components for establishing a communication links to other node 300 in the system or network 100 of FIG. 1.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method for reconstructing a personal area network ("PAN") after a failure in the PAN, the method comprising:
    detecting, by a node, a power failure in the node;
    storing, by the node, data about a parent node in a system at a time of the power failure;
    detecting, by the node, power restoration in the node and entering into a restoration state in response to detecting the power restoration;
    transmitting, by the node and in response to entering into the restoration state, an enhanced beacon request via a frequency channel associated with the parent node;
    receiving, by the node, an acknowledgement response from the parent node via the frequency channel associated with the parent node, wherein the node is configurable for listening for communication from the parent node via the frequency channel in response to receiving the acknowledgment response; and
    receiving, by the node, an enhanced beacon request response from the parent node via the frequency channel associated with the parent node to synchronize communication between the node and the system.

2. The method of claim 1, wherein storing data about the parent node in the system at the time of the power failure comprises:
    storing, by the node and in response to detecting the power failure, data indicating a MAC address of the parent node and wherein the frequency channel is associated with the MAC address of the parent node.

3. The method of claim 1, wherein storing data about the parent node in the system at a time of the power failure comprises:
    storing, by the node and in response to detecting the power failure, layer information associated with the node.

4. The method of claim 1, wherein storing data about the parent node in the system at the time of the power failure comprises:
    storing, by the node and in response to detecting the power failure, data indicating at least one of a plurality of nodes communicatively coupled to a same parent node with which the node is communicatively coupled.

5. The method of claim 4, wherein storing data indicating at least one of the plurality of nodes comprises storing a MAC address of the at least one of the plurality of nodes.

6. The method of claim 1, wherein the enhanced beacon request comprises an information element indicating that the node is restored from the power failure.

7. The method of claim 1, wherein detecting the power failure in the system comprises:
    detecting, by the node, a loss of power from a main power supply configured to provide power for operating the system.

8. The method of claim 1, wherein transmitting the enhanced beacon request via the frequency channel associated with the parent node comprises transmitting the enhanced beacon request via the frequency channel associated with a MAC address of the parent node.

9. The method of claim 1, wherein the enhanced beacon request response comprises instructions indicating a MAC layer operation and the node is configured for performing the MAC layer operation.

10. The method of claim 1, further comprising: transmitting, by the node, the enhanced beacon request to at least one of a plurality of nodes of the PAN to synchronize communication between the node and the system.

11. A system for reconstructing a personal area network ("PAN") after a failure in the PAN, the system comprising:
    a child node; and
    a parent node, wherein the child node comprises:
        a processor; and
        a non-transitory computer-readable medium communicatively coupled to the processor, wherein the processor is configured to perform operations comprising:
            detecting a power failure in the child node;
            storing data about the parent node at a time of the power failure;
            detecting power restoration in the child node and entering into a restoration state in response to detecting the power restoration;
            transmitting, in response to entering into the restoration state, an enhanced beacon request via a frequency channel associated with the parent node;
            receiving an acknowledgement response from the parent node via the frequency channel associated with the parent node, wherein the child node is configurable for listening for communication from the parent node via the frequency channel in response to receiving the acknowledgment response; and
            receiving an enhanced beacon request response from the parent node via the frequency channel associated with the parent node to synchronize communication between the child node and the system.

12. The system of claim 11, wherein the processor is further configured to store data about the parent node in the system at the time of the power failure by:
    storing, in response to detecting the power failure, data indicating a MAC address of the parent node and wherein the frequency channel is associated with the MAC address of the parent node.

13. The system of claim 11, wherein the processor is further configured to store data about the parent node in the system at the time of the power failure by:
    storing, in response to detecting the power failure, layer information associated with the child node.

14. The system of claim 11, wherein the processor is further configured to store data about the parent node in the system at the time of the power failure by:
    storing, in response to detecting the power failure, data indicating at least one of a plurality of child nodes communicatively coupled to a same parent node with which the child node is communicatively coupled.

15. The system of claim 14, wherein the processor is further configured to store data indicating at least one of the plurality of child nodes by storing a MAC address of the at least one of the plurality of child nodes.

16. The system of claim 11, wherein the enhanced beacon request comprises an information element indicating that the child node is restored from the power failure.

17. The system of claim 11, wherein the processor is further configured to detect the power failure in the system by:
    detecting a loss of power from a main power supply configured to provide power for operating the system.

18. The system of claim 11, wherein the processor is further configured to:

transmit the enhanced beacon request via the frequency channel associated with the parent node by transmitting the enhanced beacon request via the frequency channel associated with a MAC address of the parent node.

19. The system of claim 11, wherein the processor is further configured to:

transmit the enhanced beacon request to at least one of a plurality of nodes of the PAN to synchronize communication between the child node and the system.

20. A method for reconstructing a personal area network ("PAN") after a failure in the PAN, the method comprising:

detecting, by a parent node, a power failure in the parent node;

detecting, by the parent node, power restoration in the parent node and entering into a restoration state in response to detecting the power restoration;

receiving, by the parent node and in response to entering into the restoration state, an enhanced beacon request from a child node via a frequency channel associated with the parent node;

transmitting, by the parent node, an acknowledgement response to the child node via the frequency channel associated with the parent node, wherein the child node is configurable for listening for communication from the parent node via the frequency channel in response to receiving the acknowledgment response; and transmitting, by the parent node, an enhanced beacon request response to the child node via the frequency channel associated with the parent node to synchronize communication between the child node and a system.

* * * * *